United States Patent [19]
Kim et al.

[11] Patent Number: 6,099,993
[45] Date of Patent: Aug. 8, 2000

[54] COLOR FILTER PANEL OF A LIQUID CRYSTAL DISPLAY AND METHOD OF MANUFACTURING THE SAME

[75] Inventors: Woong Kwon Kim; Jae Yong Park, both of Kyunggi-do; Kyoung Nam Lim, Seoul, all of Rep. of Korea

[73] Assignee: LG Electronics Inc., Seoul, Rep. of Korea

[21] Appl. No.: 09/115,263

[22] Filed: Jul. 14, 1998

[30] Foreign Application Priority Data

Jul. 14, 1997 [KR] Rep. of Korea ................ 97-32702

[51] Int. Cl.[7] ............................ G02B 5/20; G02F 1/1335
[52] U.S. Cl. ..................... 430/7; 430/319; 349/106; 349/111
[58] Field of Search .................. 430/7, 321, 319; 349/106, 110, 111

[56] References Cited

U.S. PATENT DOCUMENTS 4,867,537  9/1989  Aoki et al. .................. 349/111
5,495,354  2/1996  Jo ................................ 349/106

FOREIGN PATENT DOCUMENTS 1-167823   7/1989   Japan.
2-287435  11/1990   Japan.
4-348320  12/1992   Japan.
8-050286   2/1996   Japan.

*Primary Examiner*—John A. McPherson

[57] ABSTRACT

The present invention is directed to a method for forming a color filter panel of a liquid crystal display device, including the steps of forming a first black matrix (BM) array on a substrate, the first BM array including a plurality of first horizontal BM strips and a plurality of first vertical BM strips; forming a plurality of color filters on the substrate; forming a second BM array on the first BM array; and forming a common electrode on the substrate. Further, the present invention is directed to a color filter panel of a liquid crystal display device, including a substrate; a first BM array formed on a substrate, the first BM array including a plurality of first horizontal BM strips and a plurality of first vertical BM strips; a plurality of color filters formed on the substrate; a second BM array formed on the first BM array; and a common electrode formed on the substrate.

28 Claims, 16 Drawing Sheets

| | | | | |
|---|---|---|---|---|
| 0 | 0 | 0 | 0 | 0 |
| 0 | 0 | 63 | 0 | 0 |
| 0 | 0 | 0 | 0 | 0 |

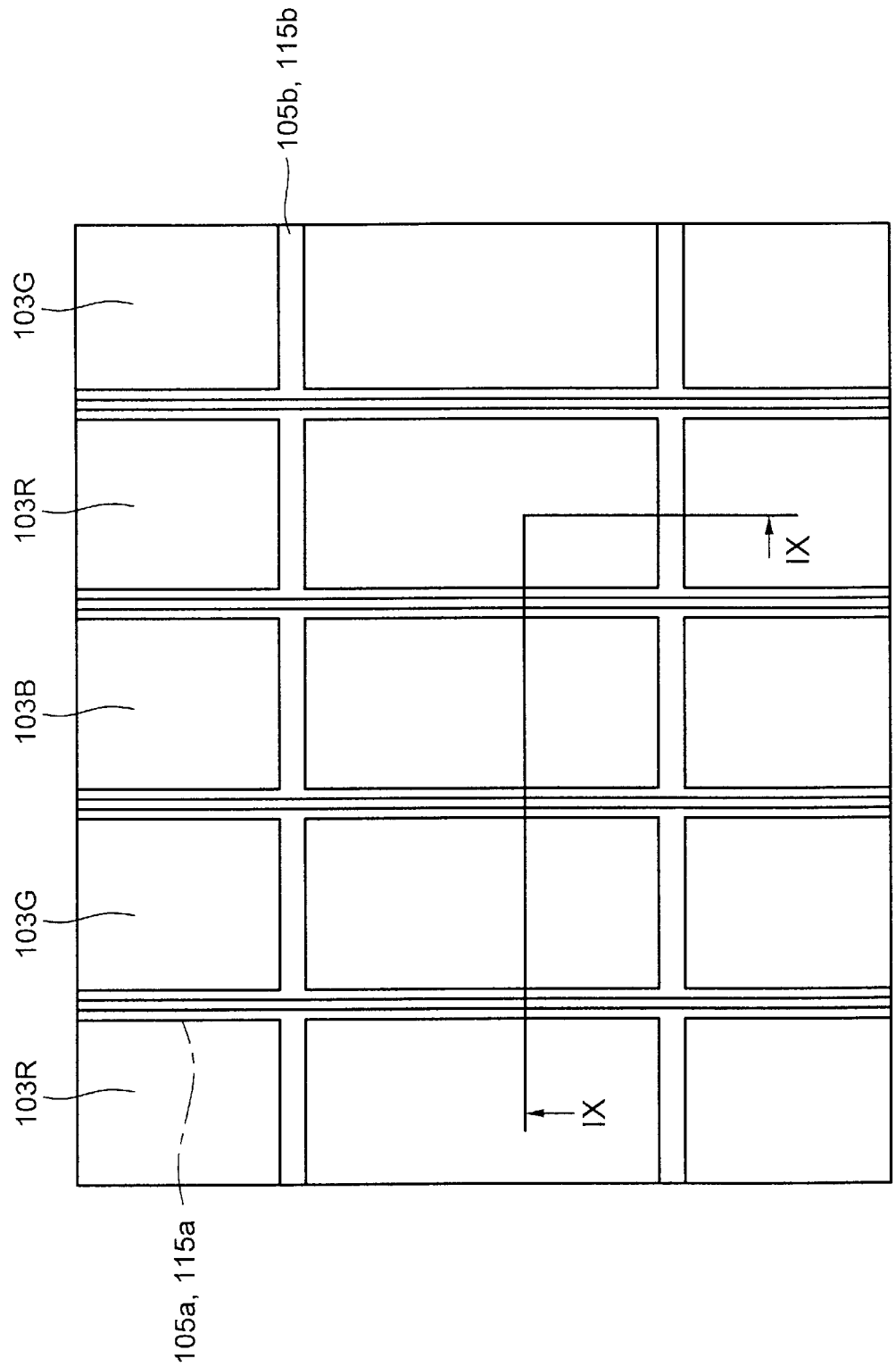

COLOR FILTER PANEL OF A LIQUID CRYSTAL DISPLAY AND METHOD OF MANUFACTURING THE SAME

BACKGROUND OF THE INVENTION

1. Field of the Invention

The present invention relates to an active matrix liquid crystal display (AMLCD) including an active panel with thin film transistors (TFTs) and pixel electrodes arranged in a matrix pattern, and a method of manufacturing the same. More particularly, the present invention relates to a method of manufacturing a color filter panel having a high aperture ratio for an AMLCD, and the color filter panel.

2. Description of the Background Art

Among display devices for showing visual images on a screen, thin film type flat panel display devices are highly favored because of their light weight and easy adaptability. Especially, research activities have actively focused on the development of liquid crystal display (LCD) devices because of their high resolution and fast response time suitable for display of motion picture images.

A liquid crystal display device operates by using polarization and optical anisotrophy of a liquid crystal. By controlling the orientation of liquid crystal molecules having rod shapes using a polarization technique, transmission and interception of a light through the liquid crystal layer are achieved due to the anisotrophy of the liquid crystal. This principle is applied to conventional LCD devices.

AMLCDs having TFTs arranged in a matrix pattern and pixel electrodes connected to the TFTs provide high quality images and are now widely used. The structure of a conventional AMLCD will now be described, referring to FIG. 1.

A conventional LCD 10 includes top and bottom panels joined together with a liquid crystal injected therebetween. The top panel contains elements for reproducing color, and is called a "color filter panel." The color filter panel includes a sequential arrangement of red (3R), green (3G) and blue (3B) color filters formed on a transparent substrate 1a in a matrix pattern. Between these color filters 3R, 3G and 3B, a black matrix 5 is formed in a lattice pattern. The black matrix 5 prevents mixing of the colors at the boundary areas. On the color filters 3R, 3G and 3B, a common electrode 7 is formed. The common electrode 7 is one of the two electrodes used to generate an electric field across the liquid crystal layer when operating the LCD device.

The other panel of the conventional LCD includes switching elements and bus lines for generating the electric field to activate the liquid crystal and is called an "active panel." The active panel of the conventional LCD includes pixel electrodes 11 arranged in a matrix pattern and formed on a transparent substrate 1b. Along the horizontal direction of the pixel electrodes 11, signal bus lines (gate lines) 13 extend with a predetermined distance therebetween. Along the vertical direction of the pixel electrodes 11, data bus lines (source lines) 15 extend with a predetermined distance therebetween. At one corner of each pixel electrode 11, a TFT 17 for driving the corresponding pixel electrode 11 is formed. Each TFT 17 includes a gate electrode 23, a source electrode 25, and a drain electrode 27. The gate electrode 23 of the TFT 17 is connected with the corresponding gate line 13. The source electrode 25 of the TFT 17 is connected with the corresponding source line 15. The drain electrode 27 of the TFT is connected to the corresponding pixel electrode 11. Additionally, pads as the terminals of the bus lines are formed at the end portion of each bus line.

The color filter panel and the active panel are bonded together to face each other with a certain distance therebetween (i.e., with a certain cell gap). A liquid crystal material fills the cell gap to complete the formation of the liquid crystal panel of the LCD.

The above conventional LCD reproduces a picture image in accordance with an electrical signal received from a video processor. FIG. 2a shows a schematic circuit diagram of the LCD of FIG. 1 and FIG. 2b shows a schematic circuit diagram of a pixel part of the LCD of FIG. 1. Using FIGS. 2a and 2b, the working principle of the conventional LCD will be explained hereinbelow.

Referring to FIGS. 2a and 2b, a signal voltage is selectively applied to the gate lines 13 arrayed in a vertical direction. The signal voltage is applied to the first one of the gate lines 13 at first, then to the second one of the gate lines 13, then to the third one of the gate lines 13, and so on. That is, the signal voltage is sequentially applied to the N gate lines. The signal voltage is a pulse type waveform having a voltage of 2–5 volts with the applying time of 60–65 $\mu$sec. When the signal voltage is applied to a certain gate line 13, the gate electrodes 23 connected to that gate line 13 are applied with a scan voltage and the TFTs 17 connected to the same gate line 13 are turned on.

During the ON-state of the TFTs 17, electrical picture data from the corresponding source line 15 is transmitted from the source electrodes 25 to the drain electrodes 27 of the TFTs 17. Then the picture data is transmitted to the pixel electrodes 11 connected to the drain electrodes 27. Each signal of the picture data has two possible states, "0" and "1". The "0" state reflects no voltage difference between the corresponding pixel electrode and the common electrode, whereas the "1" state reflects a voltage difference between the corresponding pixel electrode and the common electrode. When there is a voltage difference, a voltage signal, e.g. 2–5 volts, is applied to the liquid crystal. When there is no voltage difference, a voltage signal, e.g. 0–1 volt, is applied to the liquid crystal. As a result, a voltage signal of 2–5 volts ("1" state) or 0–1 volt ("0" state) is applied to the pixel electrodes 11.

Once the scan voltage is applied to the gate line 13, before another scan voltage can be applied to the gate line 13, the gate line 13 is applied with a zero volt. The TFTs 17 connected to the gate line 13 are then switched to the OFF state. During that period, the stored capacitance at the pixel electrode is isolated and the pixel electrode remains in its present state until the next data signal is input as the next scan signal is applied.

An electrical field is applied to the liquid crystal in accordance with the voltage difference between the pixel electrode 11 and the common electrode 7. As the electrical field is formed, the arrangement direction of the liquid crystal molecules changes. Without the electrical field, the arrangement direction of the liquid crystal molecules is unchanged. Therefore, depending on whether or not the electric field is applied to the liquid crystal, a backlight from the backside of the panel is selectively transmitted through the liquid crystal layer, and a picture is reproduced on the screen of the LCD device. In FIG. 2b, the capacitance $C_{LC}$ of a liquid crystal capacitor 31 is the capacitance of a capacitor comprising the pixel electrode 11 and the common electrode 7.

In the conventional LCD having the above-described structure and operation, the gate line, the source line, the pixel electrode and the common electrode each are formed with a conductive material. Using an insulation material such as a silicon oxide or a silicon nitride, the conductive elements are electrically isolated. Then a time delay problem arises due to the resistance R of the conductive material and the capacitance C of the conductive material, as shown in equation (1).

$$T_{delay} = R*C \qquad (1)$$

Particularly, a pulse signal applied to the common electrode 7 can be distorted by the time delay $T_{delay}$ arising due to a parasitic capacitance 33 (Csc) formed between the source line 15 and the common electrode 7 and the resistance of common electrode (Rc), as shown FIG. 2c.

When a scan voltage is applied to the gate line 13, a horizontal crosstalk problem occurs because of the distortion of the scan voltage driving the TFTs 17. The horizontal crosstalk causes failure in the reproduction of original picture data by the horizontally neighboring picture areas or the horizontally neighboring pixels. For example, assume that a picture is reproduced at the Xth row of a picture area 41 as shown in FIG. 3a. At that time, a scan voltage is applied to the Xth row for selecting and turning on the Xth row. The picture data applied to the data bus line is reproduced on each picture area 41 of the Xth row. However, with the actual picture values of 0, 0, 63, 0, 0 . . . shown in FIG. 3a, the represented picture values of 0, α, 63, α, 0 . . . are present in accordance with the distortion of the waveform of the common electrode 7 as shown in FIG. 3b. Therefore, in the conventional LCD, image quality deteriorates in the horizontal direction.

Reducing the parasitic capacitance (Csc) or the resistance of the common electrode (Rc) in equation (1) may correct the horizontal crosstalk problem. In the first case where the parasitic capacitance Csc is reduced to correct the horizontal crosstalks, parasitic capacitance Csc is determined using the dielectric constant of an insulation material covering the source line and the width of the source line. These values vary in accordance with the selection of an insulation material. By selecting an insulation material which reduces parasitic capacitance, it is possible to correct partially the horizontal crosstalk problem. However, there is a limitation in selecting a proper insulation material.

Instead, the present invention suggests a solution of reforming the structure of a color filter panel. To do so, the conventional method for manufacturing a conventional color filter panel is first investigated. FIG. 4 shows a plan view of a conventional color filter panel and FIGS. 5a–5e show cross-sectional views, taken along line V—V, explaining a conventional method of manufacturing the color filter panel of FIG. 4.

As shown in FIG. 5a, an opaque metal such as chromium is deposited on a transparent glass substrate 1a. The deposited opaque metal is patterned to form a black matrix 5 (FIG. 4) between the pixels in a grid pattern. The black matrix 5 is composed of a plurality of horizontal black matrix strips 5b and vertical black matrix strips 5a. The vertical and horizontal black matrix strips 5a and 5b are disposed at positions corresponding to the gate and source lines. The width of each of the black matrix strips 5a and 5b is greater than the width of the gate and source lines. The vertical black matrix strip 5a is formed corresponding to the position of the source line, and the horizontal black matrix strip 5b is formed corresponding to the position of the gate line.

As shown in FIG. 5b, a resin having a color among red, green and blue is selectively coated over the substrate 1a and the black matrix strips 5a and 5b. For example, a red resin is coated and patterned to form a plurality of red color filters 3R arranged with a predetermined space therebetween.

Next, as shown in FIG. 5c, a green resin is coated and patterned to form a plurality of green color filters 3G arraying near the red color filters 3R. Finally, a blue resin is coated and patterned to form a plurality of blue color filters 3B arraying between the green color filters 3G and the red color filters 3R. In the step of forming such color filters, certain portions of the vertical black matrix strips 5a are exposed between the color filters 3R, 3G and 3B. As shown in FIG. 5d, however, the horizontal black matrix strips 5b formed along the gate lines are completely covered by the color filters.

As shown in FIG. 5e, indium tin oxide (ITO) is deposited on the color filters 3R, 3G and 3B to form a common electrode 7. In this case, the brightness rate (aperture ratio) is reduced and power consumption of the LCD increases, because the width of the vertical black matrix strips is greater than that of the corresponding source line. The wider the width of the vertical black matrix strip is the lower the aperture ratio becomes. Therefore, by reducing the width of the black matrix strips, an LCD panel with a high aperture ratio can be obtained. FIGS. 6 and 7 depict a general LCD panel having black matrix strips with reduced width.

In the color filter panel of the LCD shown in FIGS. 6 and 7, the width of the vertical black matrix strips 5a is smaller than that of the uncovered part of the source lines of the active panel. Because the width of the vertical black matrix strips 5a is small, the color filters 3R, 3G and 3B contact each other and completely cover the black matrix strips 5a and 5b. For example, as shown in FIG. 7, two of the color filters 3R, 3G and 3B completely cover the strips 5a and contact each other on the strips 5a. Further, the red color filter 3R completely covers the horizontal black matrix strip 5b.

Comparing the LCD panels of FIGS. 5e and 7, in the LCD panel shown in FIG. 5e, the vertical black matrix strips 5a formed between the color filters 3R, 3G and 3B are electrically connected to the common electrode 7. The resistance of the common electrode 7 (Rc) is then lower than the resistance of the ITO ($R_{ITO}$), because the resistance Rc is connected with the resistance of the black matrix ($R_{BM}$) in parallel. ITO is used to form the common electrode. The following equation (2) depicts the relation between different resistances.

$$Rc = R_{ITO}*R_{BM}/(R_{ITO}+R_{BM}) < R_{ITO} \qquad (2)$$

According to equation (2), although crosstalks are reduced in the color filter panel of FIG. 5e, other problems still exist.

On the other hand, in the LCD panel shown in FIG. 7, the common electrode 7 does not directly contact the vertical and horizontal black matrix strips 5a and 5b formed on the color filters 3R, 3G and 3B. Then the resistance of the common electrode (Rc) is the same as the resistance of the ITO ($R_{ITO}$) as shown in the following equation (3).

$$Rc = R_{ITO} \qquad (3)$$

Therefore, in the LCD panel of FIG. 7, a crosstalk problem still exists due to the resistance of the ITO, and the quality of the picture produced by this LCD device is worse than the quality produced by the LCD panel shown in FIG. 4.

SUMMARY OF THE INVENTION

An object of the present invention is to change the structure of a color filter panel in a high aperture ratio LCD panel, so that a common electrode is electrically connected with a black matrix.

Another object of the present invention is to provide a color filter panel of an LCD device which overcomes problems encountered in the conventional LCD devices.

Another object of the present invention is to solve the crosstalk problem in the conventional high aperture ratio LCD panel.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a method for forming a color filter panel of a liquid crystal display device, comprising the steps of forming a first black matrix (BM) array on a substrate, the first BM array including a plurality of first horizontal BM strips and a plurality of first vertical BM strips; forming a plurality of color filters on the substrate; forming a second BM array on the first BM array; and forming a common electrode on the substrate.

Furthermore, the present invention is directed to a color filter panel of a liquid crystal display device, including a substrate; a first black matrix (BM) array formed on a substrate, the first BM array including a plurality of first horizontal BM strips and a plurality of first vertical BM strips; a plurality of color filters formed on the substrate; a second BM array formed on the first BM array; and a common electrode formed on the substrate.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention and wherein:

FIG. 8 is a plan view showing a structure of a high aperture ratio color filter panel of an LCD in accordance with the embodiments of the present invention;

DETAILED DESCRIPTION OF THE PREFERRED EMBODIMENTS

Figure 1:
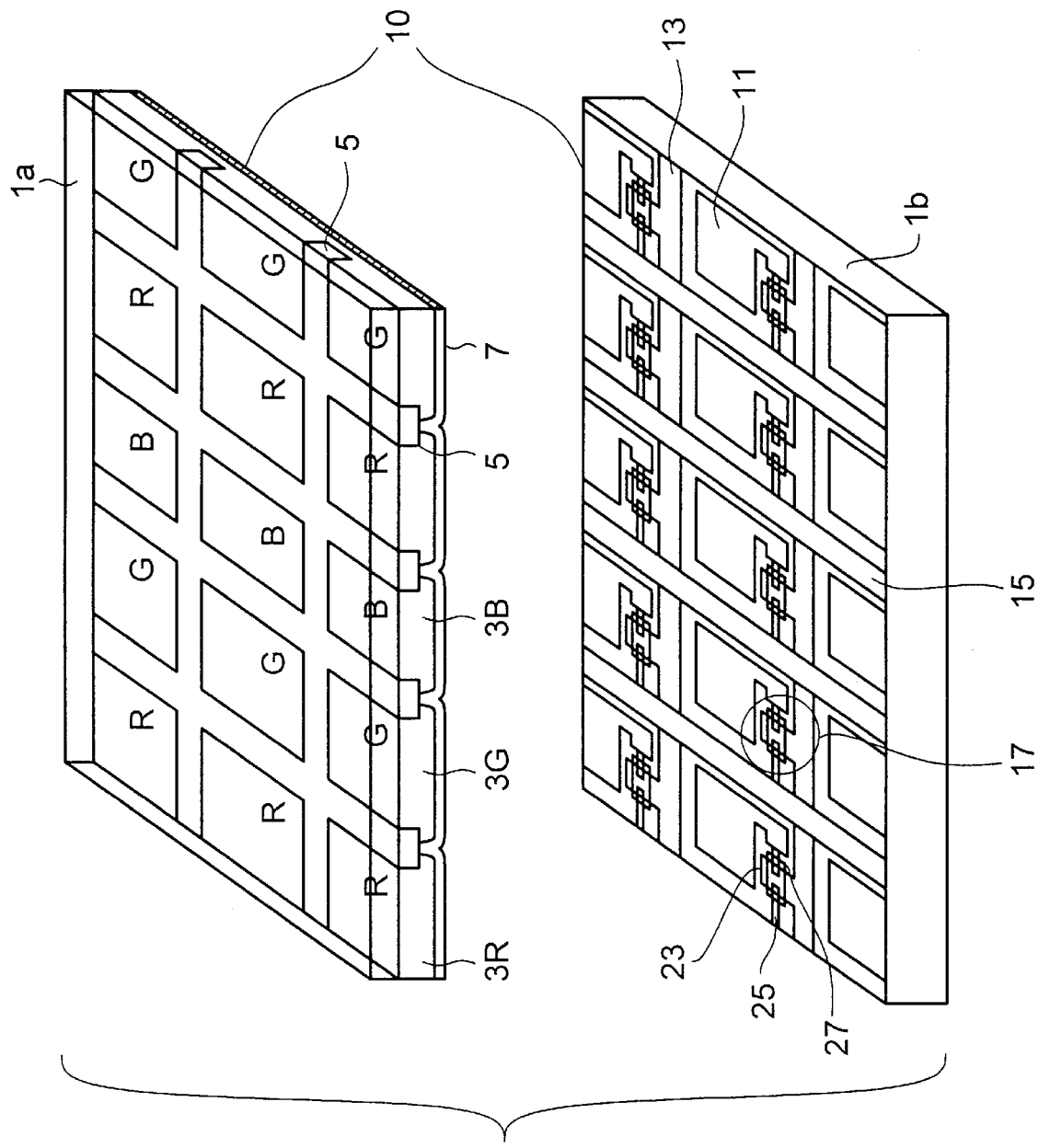
FIG. 1 is a perspective view showing the conventional structure of an LCD device.
Figure 2A:
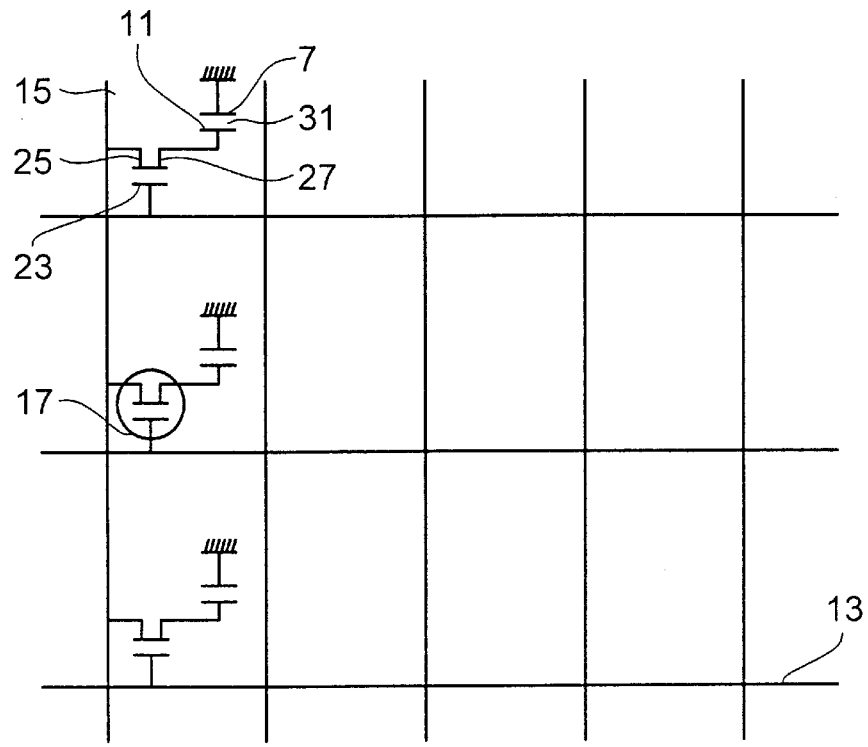
FIG. 2a is a schematic circuit diagram of a pixel part of the LCD of FIG. 1.
Figure 2B:
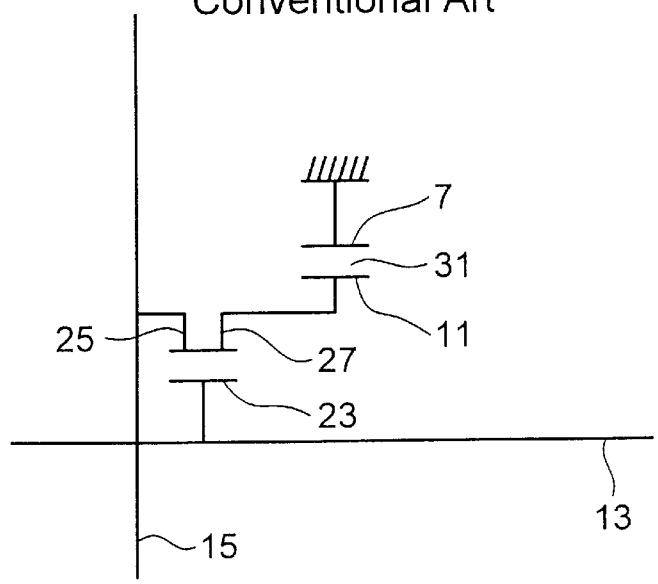
FIG. 2b is a schematic circuit diagram of a pixel part of the LCD of FIG. 1.
Figures 2C, 3A:
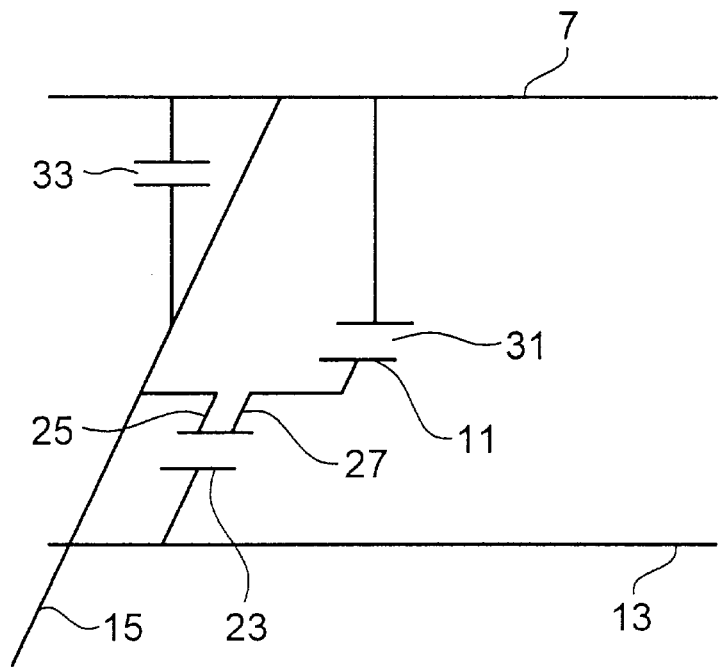
FIG. 2c is a circuit showing the parasitic capacitance between a source bus line and a common electrode in the conventional LCD.
FIGS. 3a and 3b show screen situations of the conventional LCD having a crosstalk problem.
Figure 3B:
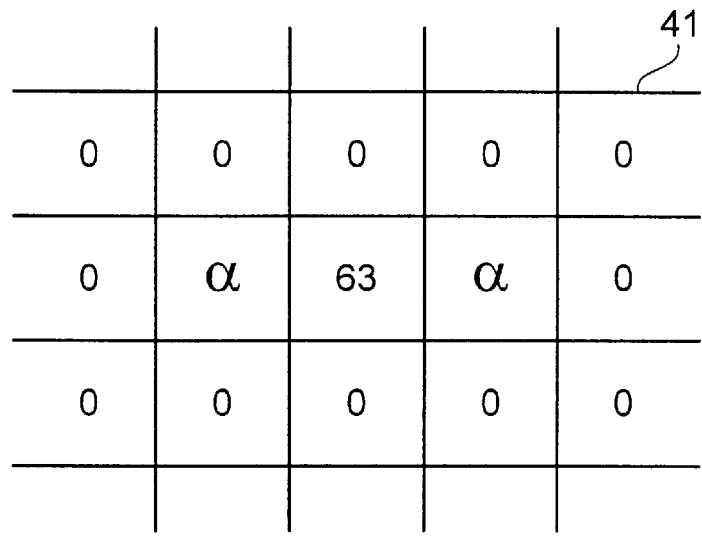
Figure 4:
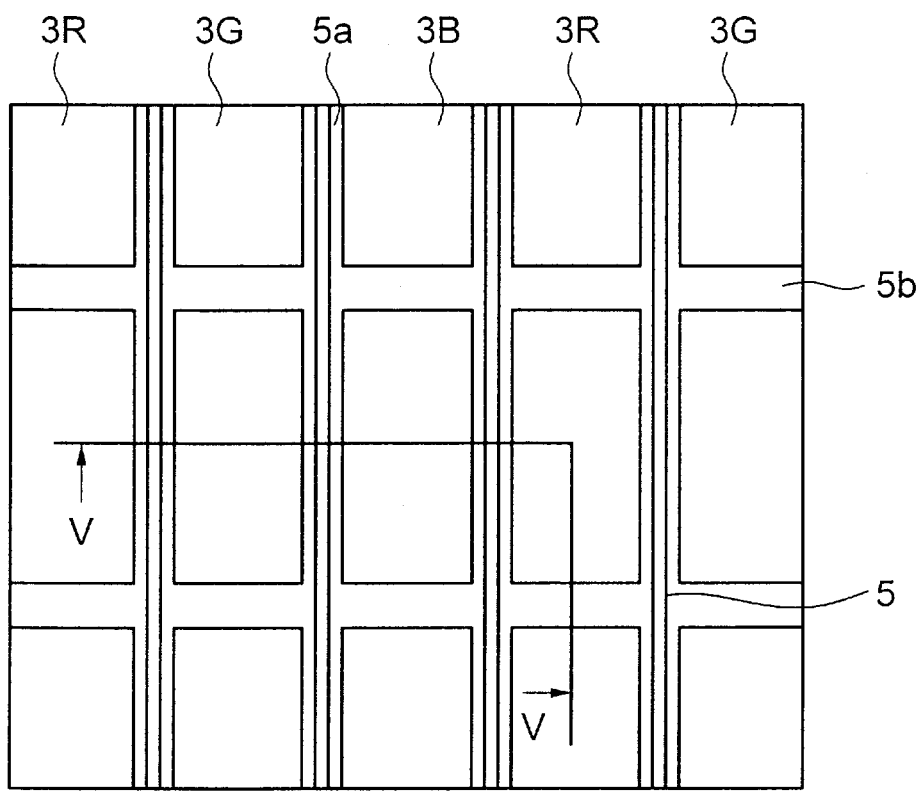
FIG. 4 shows the structure of a conventional color filter panel of an LCD.
Figure 5A:
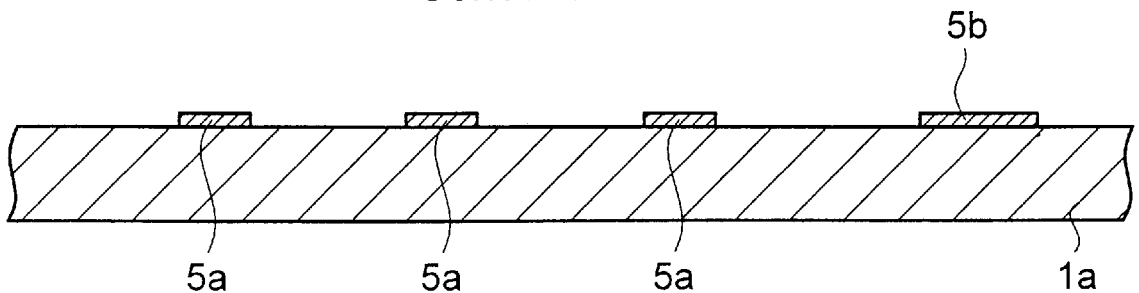
FIGS. 5a–5e are cross-sectional views showing a conventional method for manufacturing the color filter panel of FIG. 4, taken alone line V—V of FIG. 4.
Figure 5B:
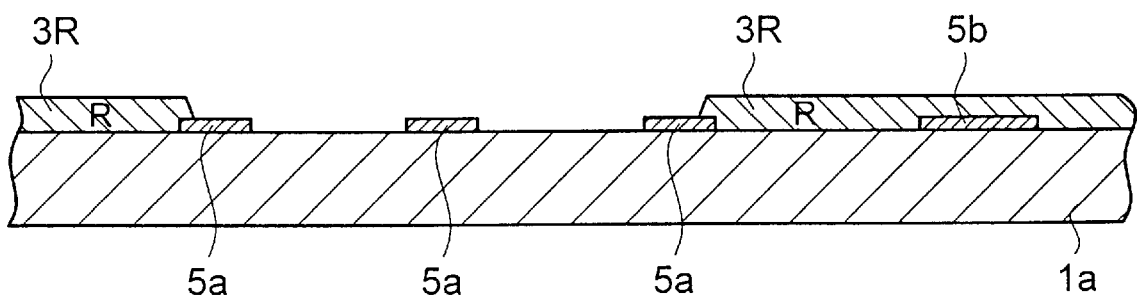
Figure 5C:
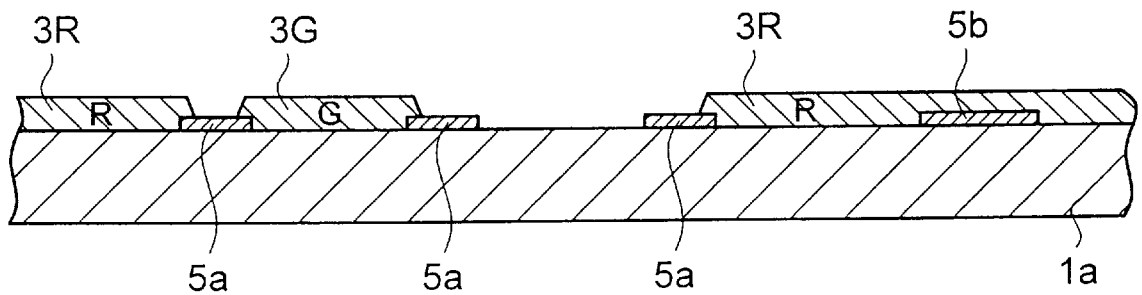
Figure 5D:
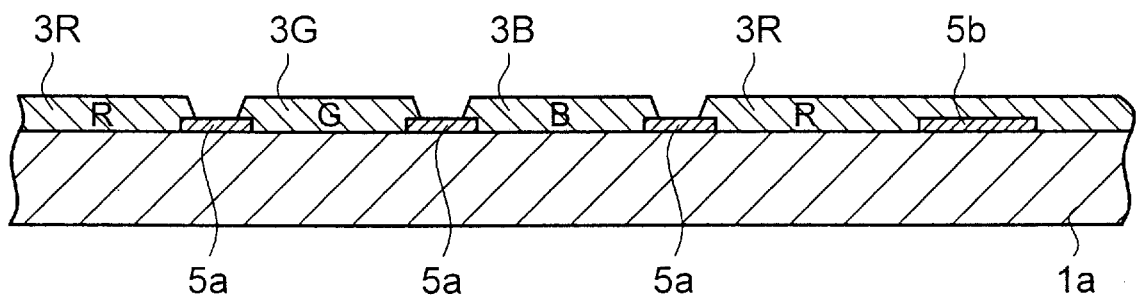
Figure 5E:
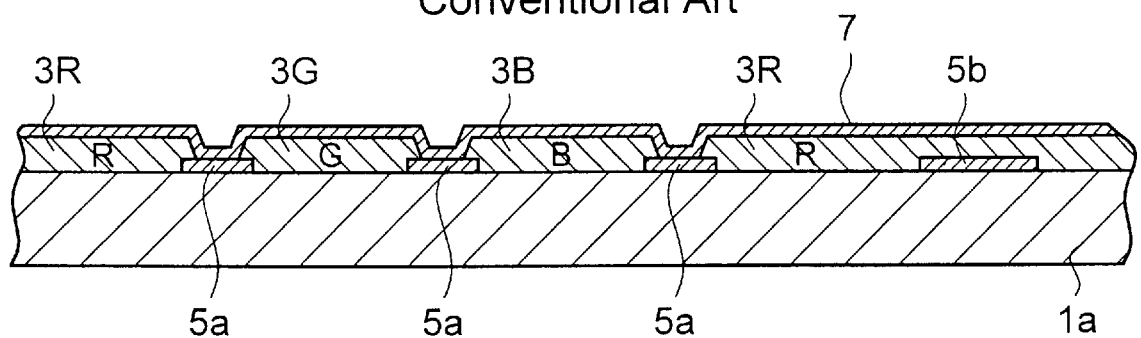
Figure 6:
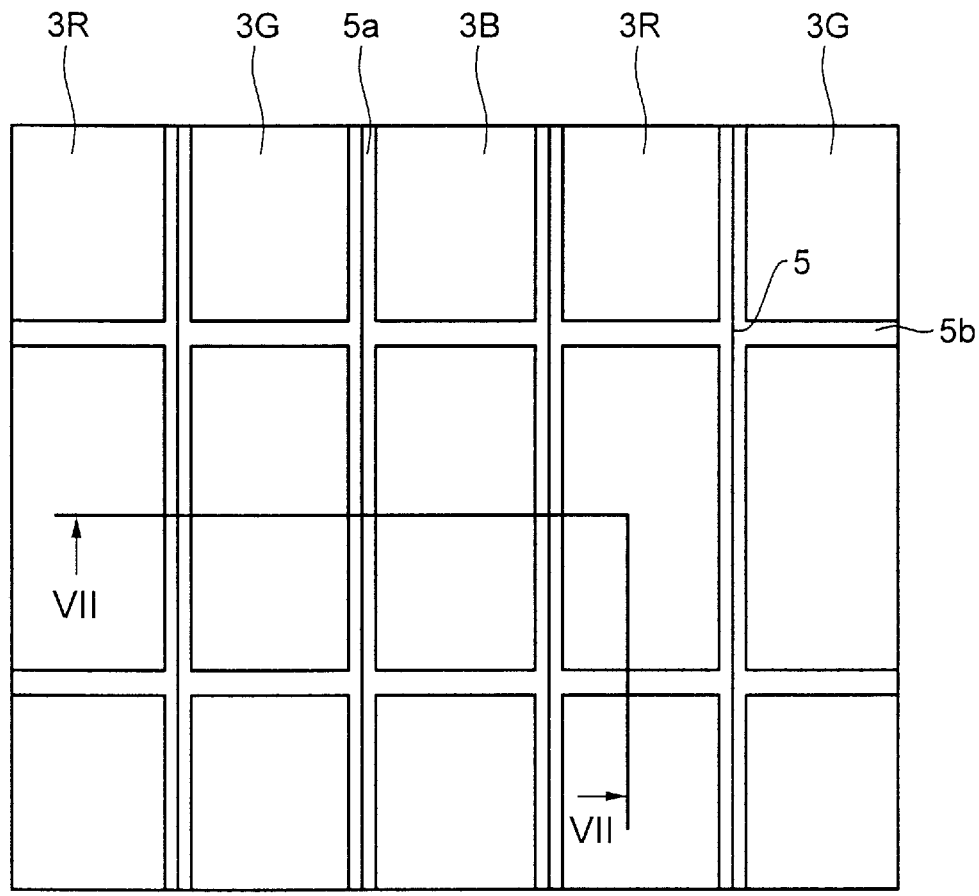
FIG. 6 is a plan view showing the conventional structure of a high aperture ratio color filter panel of an LCD.
Figure 7:
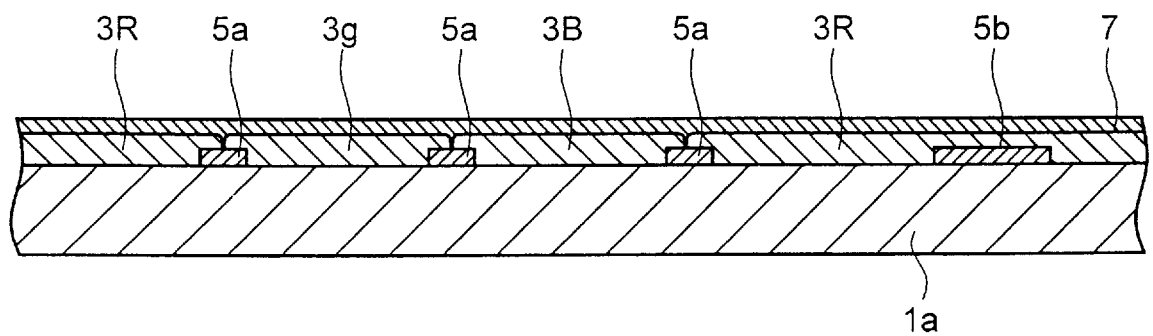
FIG. 7 is a cross-sectional view, taken alone line VII—VII of FIG. 6.
Figure 9A:
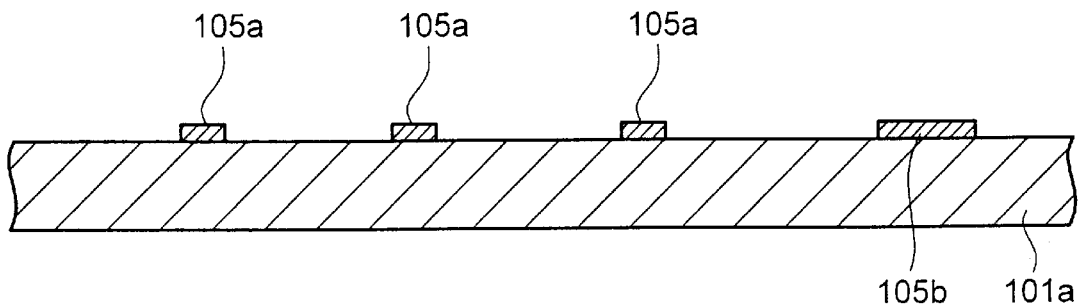
FIGS. 9a–9g are cross-sectional views showing a method for manufacturing a high aperture ratio color filter panel in accordance with a first embodiment of the present invention.
Figure 9B:
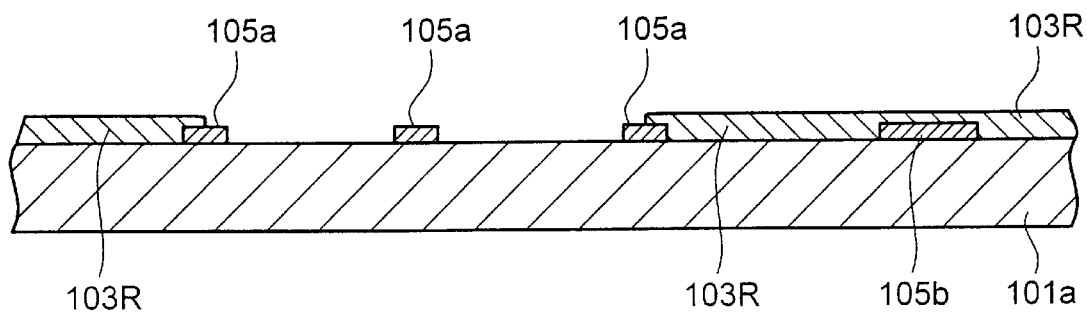
Figure 9C:
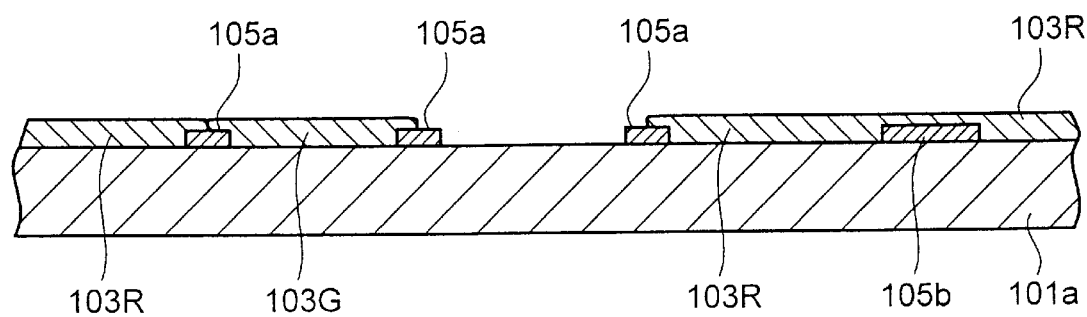
Figure 9D:
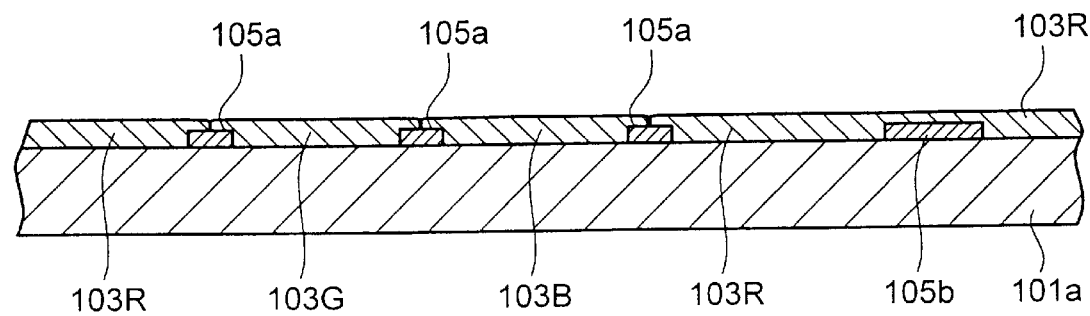
Figure 9E:
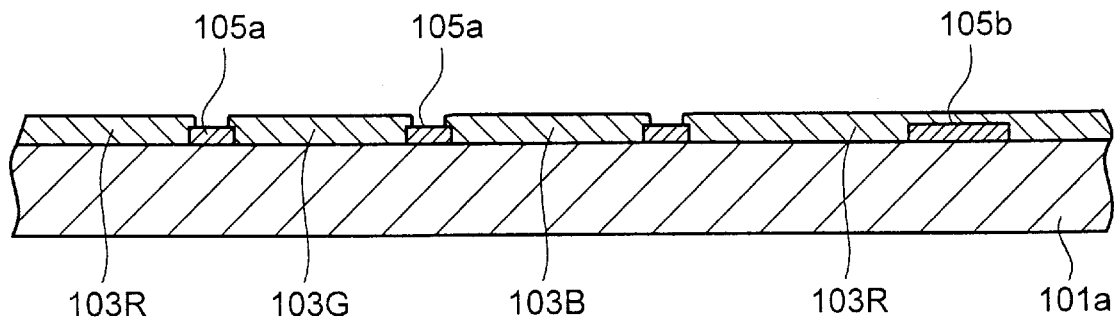
Figure 9F:
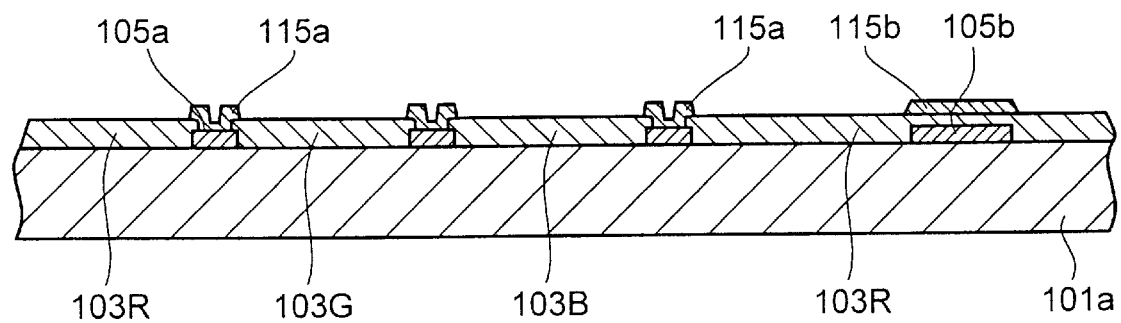
Figure 9G:
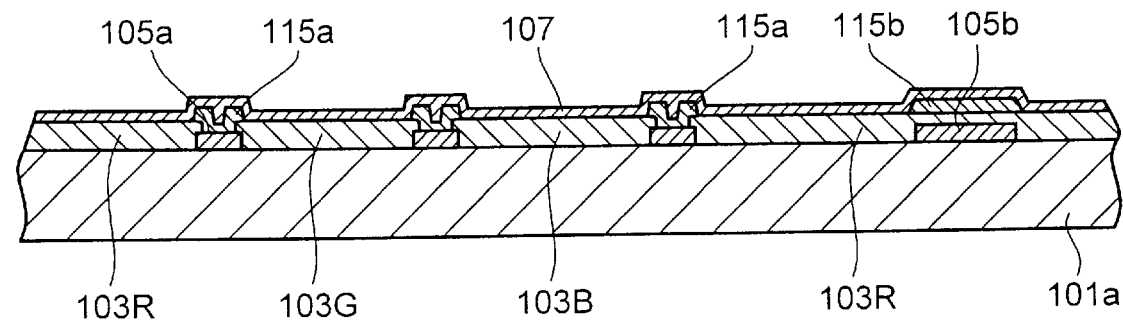
Figure 10A:
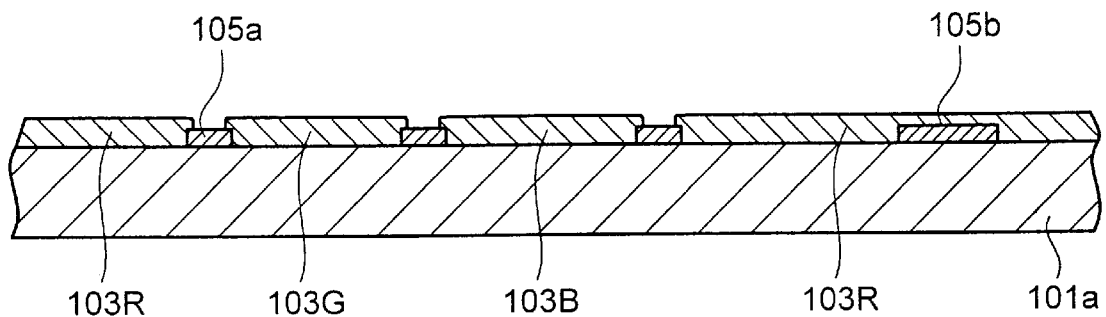
FIGS. 10a–10c are cross-sectional views showing a method for manufacturing a high aperture ratio color filter panel in accordance with a second embodiment of the present invention.
Figure 10B:
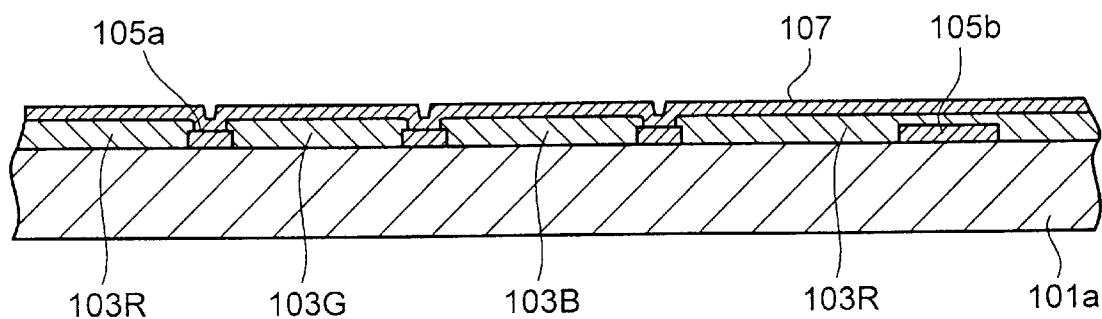
Figure 10C:
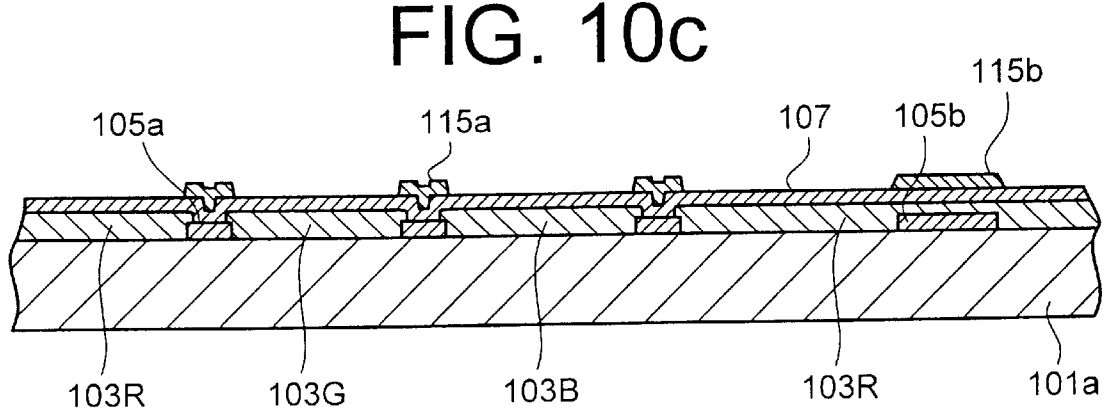

FIG. 8 shows a plan view of a color filter panel of an LCD panel according to the embodiments of the present invention, FIGS. 9a–9g show cross-sectional views, taken along line IX—IX of FIG. 8, for explaining a method for manufacturing a color filter panel of an LCD in accordance with a first embodiment of the present invention, and FIGS. 10a–10c show cross-sectional views, taken along line IX—IX of FIG. 8, for explaining a method for manufacturing a color filter panel of an LCD in accordance with a second embodiment of the present invention.

As shown in FIG. 9a, an opaque metal such as chromium is deposited on a transparent insulation substrate 101a. The insulation substrate 101a may be, e.g., a non-alkaline glass. The deposited opaque metal is patterned by a photo-lithography to form vertical black matrix strips 105a each having a width narrower than that of the corresponding source line formed on another substrate (not shown). By patterning the opaque metal, a plurality of horizontal black matrix strips 105b are also formed perpendicular to the vertical black matrix strips 105a, so that the vertical and horizontal black matrix strips 105 and 105b form a grid-patterned black matrix 105. The horizontal black matrix strips 105 correspond to the gate bus lines disposed in the active panel.

As shown in FIG. 9b, a red resin is coated on the substrate 101a having the black matrix strips 105a and 105b, and patterned to form red color filters 103R arraying at specific locations. The red color filters 103R are formed at every third pixel area.

As shown in FIG. 9c, a green resin is coated and patterned to form green color filters 103G adjacent the red color filters 103R. The green color filters 103G are disposed to correspond to the pixel array and are formed on one side of the red color filters 103R.

As shown in FIG. 9d, a blue resin is coated and patterned to form blue color filters 103B between the green and red color filters 103G and 103R. The blue color filters 103B are disposed to correspond to the pixel array between the red color filters 103R and the green color filters 103G. Although it is described here that the red, green and blue resins are applied in such order, they may be applied in different sequence. The color filters 103R, 103B and 103G overlap each other or contact each other. Each of the vertical black matrix strips 105a is completely covered by at least one color filter. The width of the horizontal black matrix strips 105b is greater than that of the vertical black matrix strips 105a.

As shown in FIG. 9e, border portions where the color filters 103R, 103G and 103B overlap or contact each other above the vertical black matrix strips 105a are removed by etching to expose portions of the vertical black matrix strips 105a.

As shown in FIG. 9f, a metal having a lower resistance than that of chromium, such as aluminum, is deposited on the color filters 103R, 103G and 103B and the exposed portions of the vertical black matrix strips 105a. The deposited metal layer is patterned to form low resistance vertical black matrix strips 115a and low resistance horizontal black matrix strips 115b, at positions corresponding to the vertical and horizontal black matrix strips 105a and 105b. The position, shape and size of the low resistance black matrix strips 115a and 115b substantially correspond to those of the black matrix strips 105a and 105b. The vertical black matrix strips 105a contact the low resistance vertical black matrix strips 115a; however, the horizontal black matrix strips 105b do not contact the low resistance horizontal black matrix strips 115b.

As shown in FIG. 9g, an indium tin oxide (ITO) is deposited on the low resistance black matrix strips 115a and 115b and the color filters 103R, 103G and 103R, so as to form a common electrode 107. The ITO is electrically connected with the low resistance black matrix strips 115a and 115b and with the vertical black matrix strips 105a.

In the equivalent circuit diagram for the structure as shown in FIG. 9g, the resistance of the black matrix strips 105a and 105 ($R_{BM}$), the resistance of the low resistance black matrix strips ($R_{LBM}$), and the resistance of the ITO ($R_{ITO}$) are connected in parallel. Therefore, the total resistance of the common electrode 107 ($R_C$) is lower than that of the ITO for reducing crosstalks, as can be realized by the following equation.

$$R_C = R_{ITO} * R_{BM} * R_{LBM} / (R_{ITO} + R_{BM} + R_{LMB}) < R_{ITO} \quad (4)$$

In accordance with a second embodiment of the present invention, the low resistance black matrix strips can be formed after the common electrode. FIGS. 10a–10c show cross-sectional view for explaining a method of manufacturing a color filter panel of an LCD, taken alone line IX—IX in FIG. 8, in accordance with the second embodiment of the present invention.

As in the first embodiment, vertical and horizontal black matrix strips 105a and 105b are formed on a transparent glass substrate 101a using an opaque metal such as chromium, as shown in FIG. 10a. Color filters 103R, 103G and 103B are formed thereon using the red, green and blue resins. Then the border portions where the color filters 103R, 103G and 103B overlap or contact with each other above the vertical black matrix strips 105a are removed by etching so as to expose portions of the vertical black matrix strips 105a. These steps are the same as the steps performed up to FIG. 9e in the first embodiment.

As shown in FIG. 10b, an indium tin oxide (ITO) is deposited on the color filters 103R, 103G and 103B and the exposed portions of the vertical black matrix strips 105a, to form a common electrode 107. The common electrode 107 contacts the vertical black matrix strips 105a, but not the horizontal black matrix strips 105b.

As shown in FIG. 10c, a metal, such as aluminum, which has a lower resistance than the chromium forming the strips 105a and 105b, is deposited on the common electrode 107. The deposited metal layer is patterned to form low resistance vertical and horizontal black matrix strips 115a and 115b. The shape, size and position of the low resistance strips 115a and 115b respectively and substantially correspond to those of the strips 105a and 105b.

In the equivalent circuit diagram for the structure as shown in FIG. 10c, the resistance of the black matrix strips 105a and 105b ($R_{BM}$), the resistance of the low resistance black matrix strips 115a and 115b ($R_{LBM}$), and the resistance of the ITO ($R_{ITO}$), are connected in parallel. Therefore, the total resistance of the common electrode 107 ($R_C$) is lower than that of the ITO for reducing crosstalks, as can be seen in above equation (4).

Figure 11:
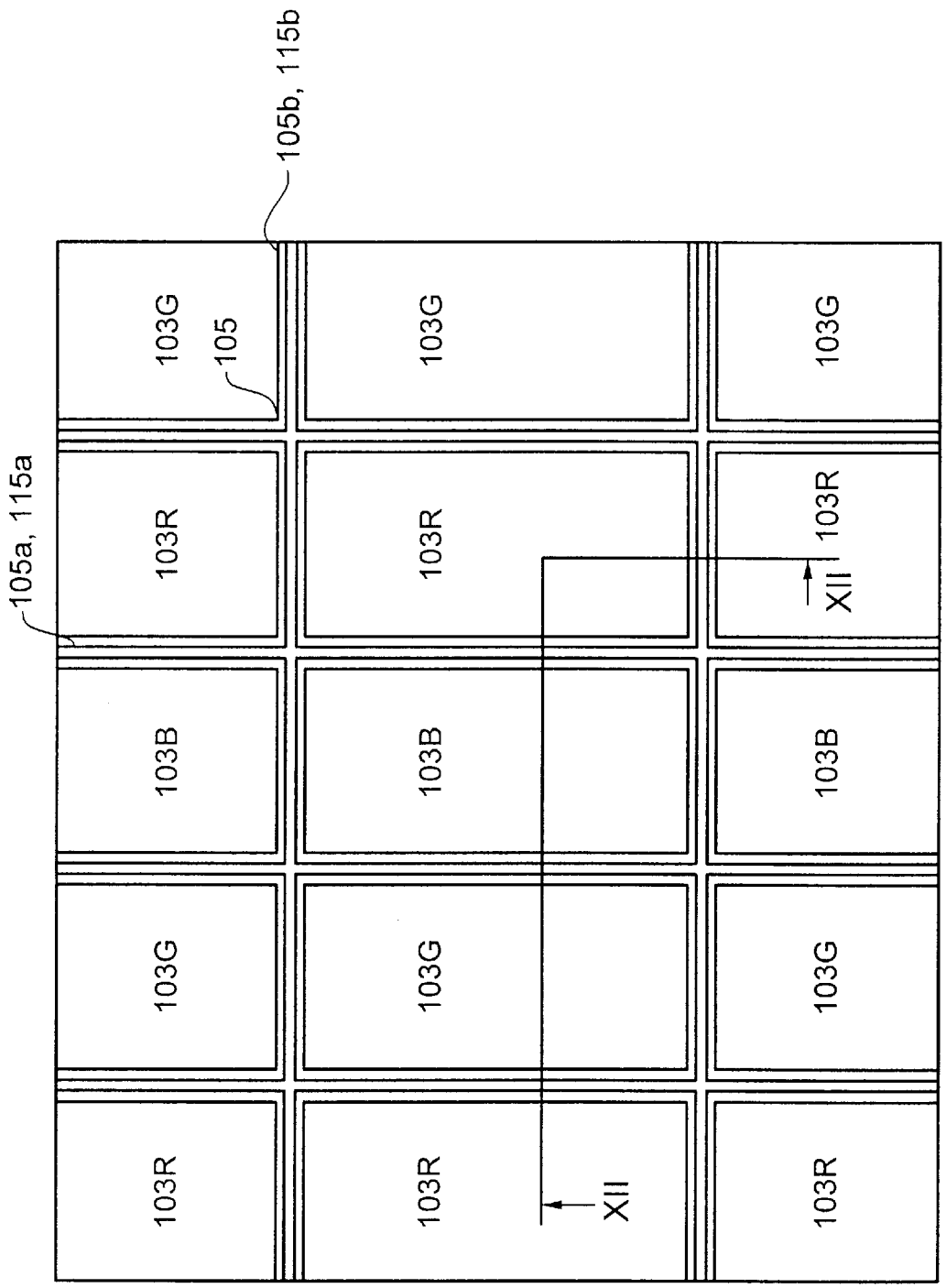
FIG. 11 is a plan view showing another structure of a high aperture ratio color filter panel in accordance with the embodiments of the present invention.

For still another example of the present invention, portions of vertical and horizontal black matrix strips are electrically connected with a common electrode and low resistance vertical and horizontal black matrix strips. FIG. 11 shows another example of a plan view of a color filter panel of an LCD according to the embodiments of the present invention, and FIG. 12a–12g show cross-sectional views for explaining a method of manufacturing a color filter panel of an LCD, taken along line XII—XII in FIG. 11, in accordance with a third embodiment of the present invention.

Figure 12A:
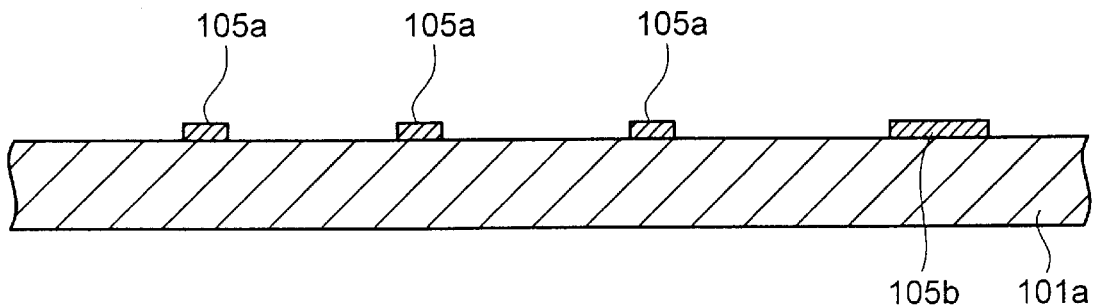
FIGS. 12a–12g are cross-sectional views showing a method for manufacturing a high aperture ratio color filter panel in accordance with a third embodiment of the present invention.

As in the first embodiment, an opaque metal such as chromium is deposited on a transparent insulation substrate 101a, such as a non-alkaline glass, as shown in FIG. 12a. The deposited metal layer is patterned by a photolithography to form vertical black matrix strips 105a each having a width narrower than that of the corresponding source bus line formed on another substrate (not shown). At the same time, a plurality of horizontal black matrix strips 105b are formed perpendicular to the vertical black matrix strips 105a, so that the vertical and horizontal black matrix strips 105a and 105b form a grid-patterned black matrix 105. The horizontal black matrix strips 105b correspond to the gate bus lines disposed in the active panel.

Figure 12B:
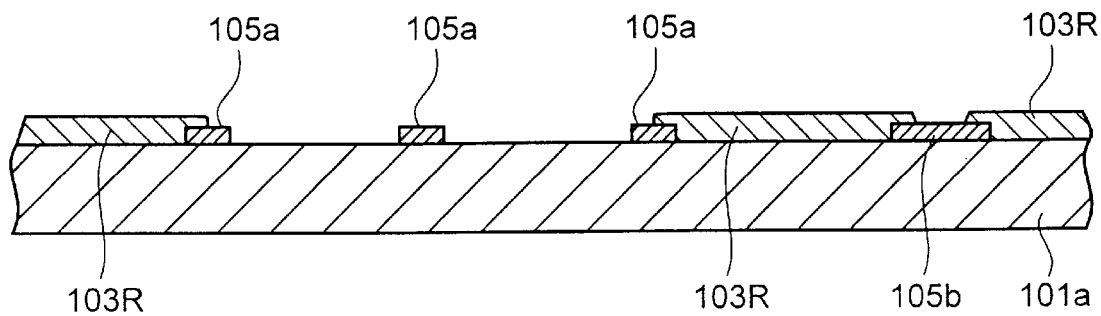

As shown in FIG. 12b, a red resin is coated on the substrate 101a having the black matrix strips 105a and 105b, and patterned to form red color filters 103R arraying at specific locations. The red color filters 103R are formed at every third pixel area. However, each of the red color filters 103R in FIG. 12b does not have a stripe shape (as in FIG. 8), but has a discrete segment shape in accordance with the pixel shape so that portions of the horizontal black matrix strips 105b are exposed.

Figure 12C:
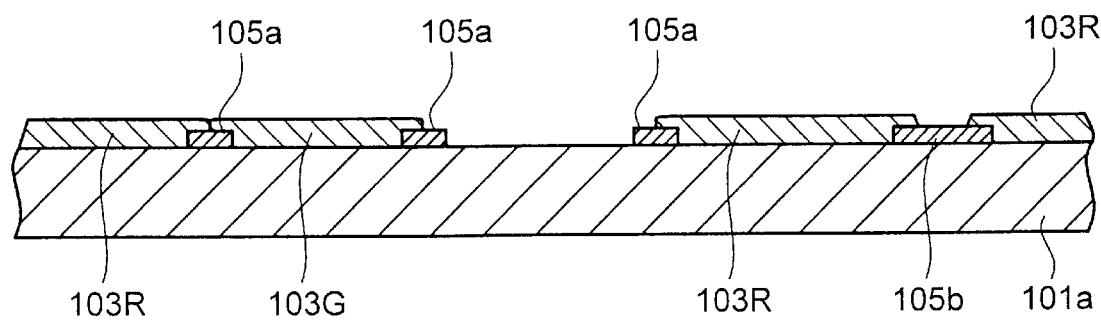

As shown in FIG. 12c, a green resin is coated and patterned to form green color filters 103G adjacent the red color filters 103R. The green color filters 103G are disposed to correspond to the pixel array and are formed on one side of the red color filters 103R. The green color filters 103G also do not have a stripe shape, but have a discrete segment shape in accordance with the pixel shape so that portions of the horizontal black matrix strips 105b adjacent the green color filters 103G are exposed.

Figure 12D:
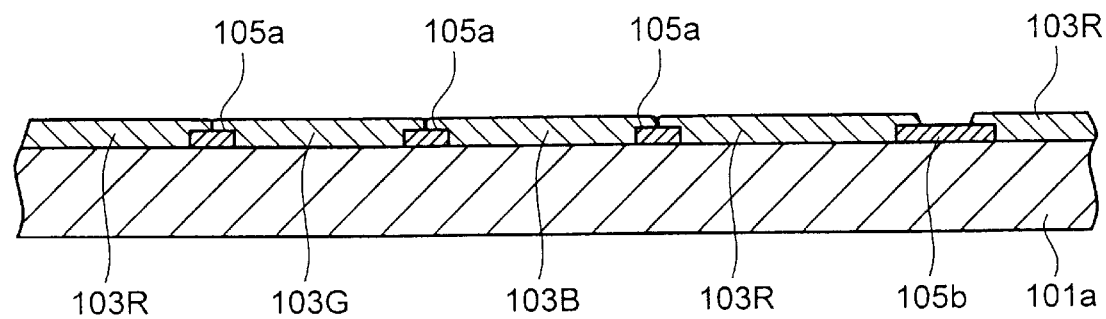

As shown in FIG. 12d, a blue resin is coated and patterned to form blue color filters 103B between the green and red color filters 103G and 103R. The blue color filters 103B are disposed to correspond with the pixel array between the red color filters 103R and the green color filters 103G. The blue color filters 103B also do not have a stripe shape, but have a discrete segment shape in accordance with the pixel shape so that portions of the horizontal black matrix strips 105b adjacent the blue color filters 103B are exposed.

Figure 12E:
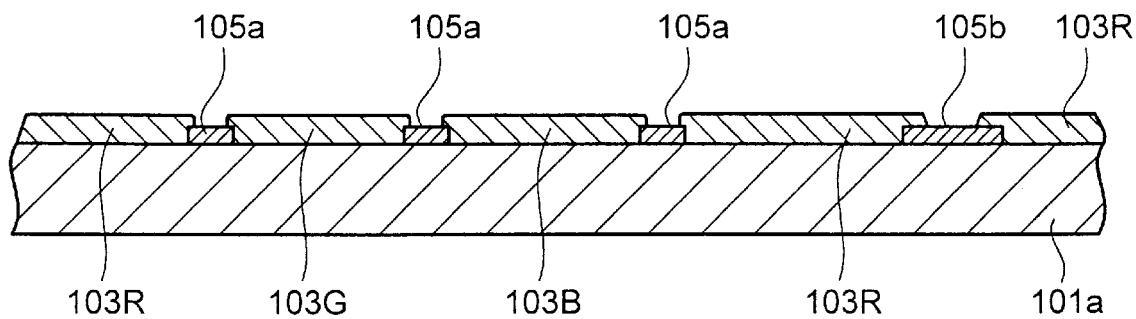

As shown is FIG. 12e, border portions where the color filters 103R, 103G and 103B overlap or contact each other above the vertical black matrix strips 105a are removed by etching to expose portions of the vertical black matrix strips 105a.

Figure 12F:
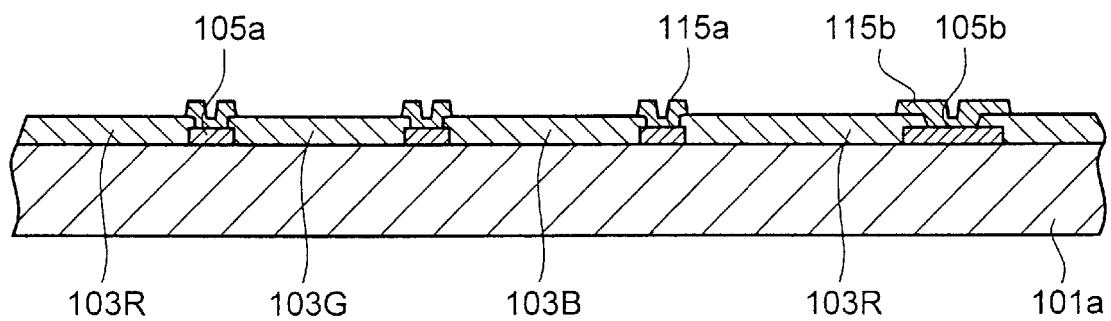

As shown in FIG. 12f, a metal having a lower resistance than that of chromium, such is aluminum, is deposited on the color filters 103R, 103G and 103B and the exposed portions of the vertical black matrix strips 105a. The deposited metal layer is patterned to form low resistance vertical black matrix strips 115a and low resistance horizonal black matrix strips 115b, at positions corresponding to the vertical and horizontal black matrix strips 105a and 105b. The position, shape and size of the low resistance black matrix strips 115a and 115b substantially and respectively correspond to those of the black matrix strips 105a and 105b. The vertical black matrix strips 105a contact the low resistance vertical black matrix strips 115a and the horizontal black matrix strips 105b contact the low resistance horizontal black matrix strips 115b.

Figure 12G:
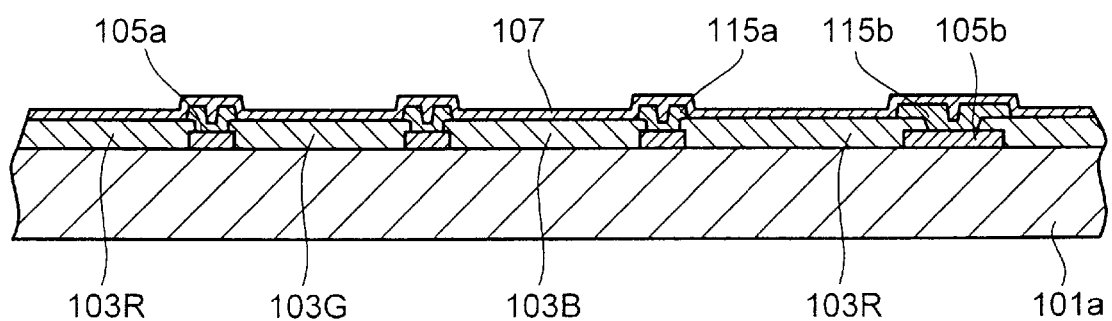

As shown in FIG. 12g, an indium tin oxide (ITO) is deposited on the low resistance black matrix strips 115a and 115b and the color filters 103R, 103G and 103R, so as to form a common electrode 107. The ITO is electrically connected with the low resistance black matrix strips 115a and 115b and with the vertical and horizontal black matrix strips 105a and 105b.

In the equivalent circuit diagram for the structure as shown in FIG. 12g, the resistance of the black matrix strips 105a and 105b ($R_{BM}$) the resistance of the low resistance black matrix strips 115a and 115b ($R_{LBM}$), and the resistance of the ITO ($R_{ITO}$) are connected in parallel. Therefore, the total resistance of the common electrode 107 ($R_C$) is lower than that of the ITO for reducing crosstalks, as can be seen in above equation (4).

Figure 14A:
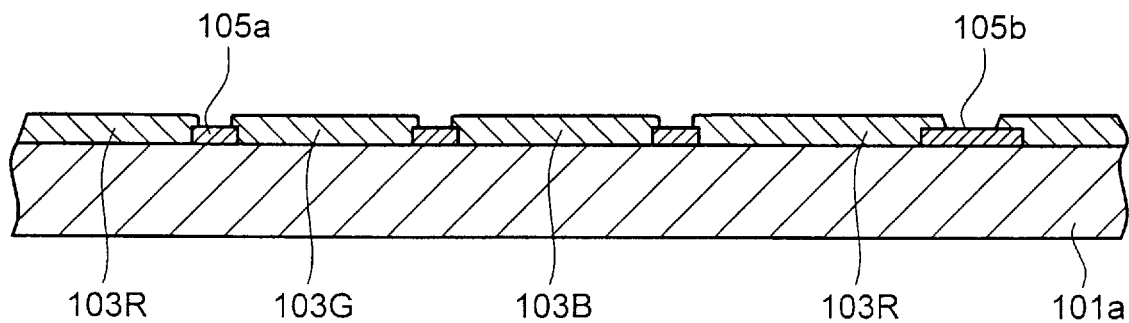
FIGS. 14a–14c are cross-sectional views showing another example of the methods of FIGS. 12a–13d in accordance with the third and fourth embodiments of the present invention.
Figure 14B:
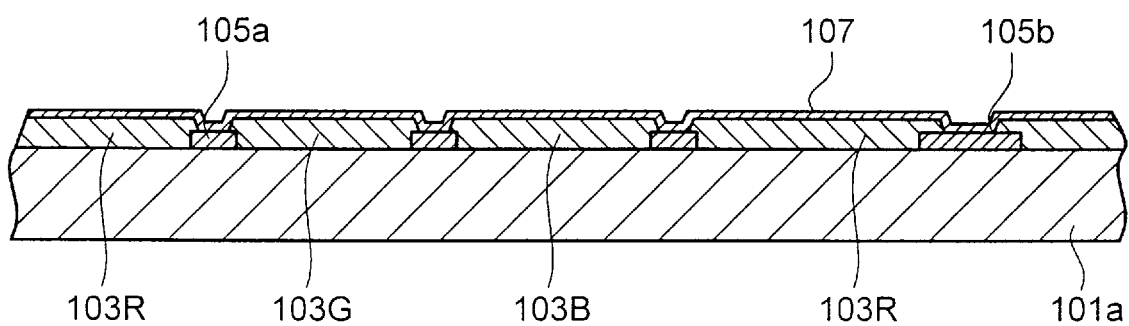
Figure 14C:
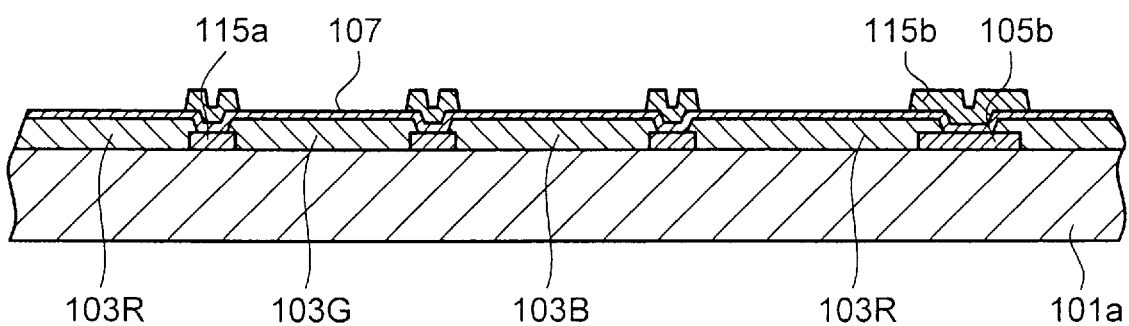

For yet another example of the present invention according to the third embodiment, the low resistance black matrix strips 115a and 115b can be formed after the common electrode 107 is formed. For example, once the above-described steps of the present method are performed to achieve the structure shown in FIG. 12e (FIG. 14a), a common electrode 107 is formed on the color filters 103R, 103G and 103B and on the exposed portions of the vertical and horizontal matrix strips 105a and 105b as shown in FIG. 14b. Then as shown in FIG. 14c, an indium tin oxide (ITO) is deposited and patterned on the common electrode 107 to form the low resistance vertical and horizontal black matrix strips 115a and 115b.

FIGS. 13a–13d show cross-sectional views for explaining a method of manufacuring a color filter panel of an LCD, taken along line XII—XII in FIG. 11, in accordance with a fourth embodiment of the present invention.

Figure 13A:
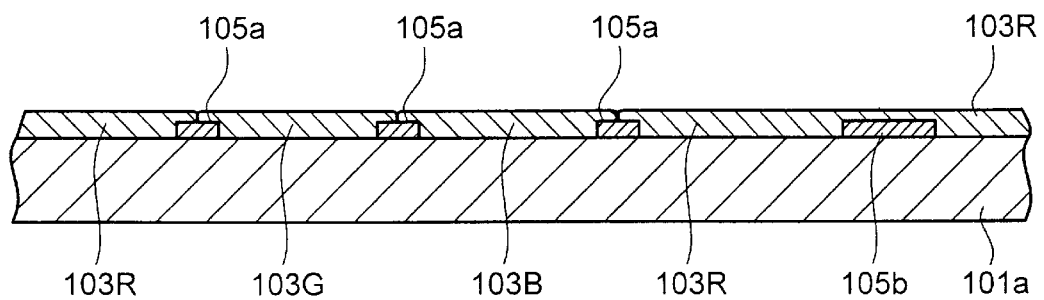
FIGS. 13a–13d are cross-sectional views showing a method for manufacturing a high aperture ratio color filter panel in accordance with a fourth embodiment of the present invention.

As in the first embodiment, an opaque metal such as chromium is deposited on a transparent insulation substrate 101a, such as a non-alkaline glass, as shown in FIG. 13a. Color filters 103R, 103G and 103B are formed thereon using red, green and blue resins. These steps are the same as the steps performed to form the structure of FIG. 9d in the first embodiment.

Figure 13B:
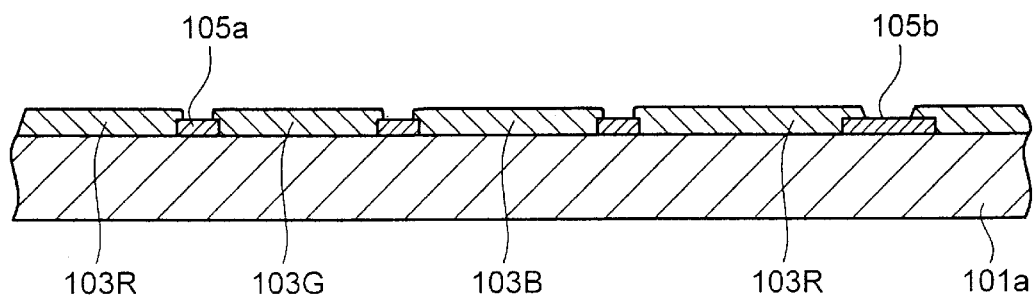

As shown in FIG. 13b, border portions where the color filters 103R, 103G and 103B overlap or contact each other above the vertical and horizontal black matrix strips 105a and 105b are removed by etching, so as to expose portions of the vertical and horizonal black matrix strips 105a and 105b.

Figure 13C:
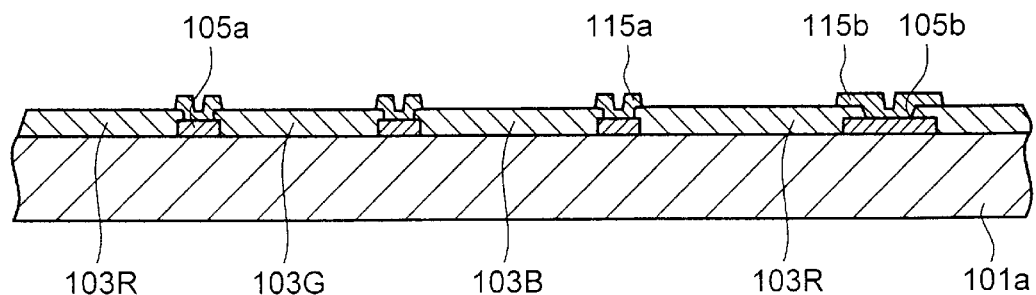

As shown in FIG. 13c, a metal, such as aluminum, which has a lower resistance than that of chromium forming the strips 105a and 105b, is deposited on the color filters 103R, 103G and 103B and the exposed portions of the vertical and horizonal black matrix strips 105a and 105b. The deposited metal layer is patterned to form low resistance black matrix strips 115a and 115b. The size, shape and position of the low resistance vertical and horizontal black matrix strips 115a and 115b respectively and substantially correspond to those of the black matrix strips 105a and 105b. Therefore, the vertical and horizontal black matrix strips 105a and 105b respectively contact the low resistance vertical and horizontal black matrix strips 115a and 115b.

Figure 13D:
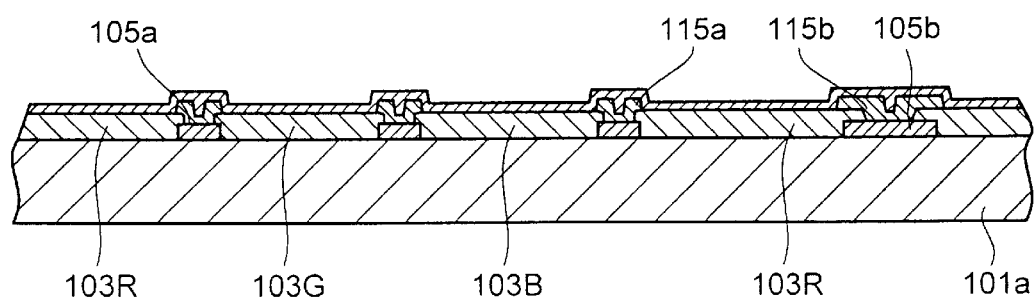

As shown in FIG. 13d, an indium tin oxide (ITO) is deposited on the color filters and the low resistance black matrix strips 115a and 115b, so as to form a common electrode 107. The ITO is electrically connected with the low resistance black matrix strips 115a and 115b and the black matrix strips 105a and 105b.

For yet another example of the present invention according to the fourth embodiment, the low resistance black matrix strips 115a and 115b can be formed after the common electrode 107 is formed. For example, once the above-described steps of the present method are performed to achieve the structure shown in FIG. 13b (FIG. 14a), a common electrode 107 is formed on the color filters 103R, 103G and 103B and on the exposed portions of the vertical and horizontal matrix strips 105a and 105b as shown in FIG. 14b. Then as shown in FIG. 14c, an indium tin oxide (ITO) is deposited and patterned on the common electrode 107 to form the low resistance vertical and horizontal black matrix strips 115a and 115b.

In the equivalent circuit diagram for the structure as shown in FIG. 13d, the resistance of the black matrix strips 105a and 105b ($R_{BM}$), the resistance of the low resistance black matrix strips 115a and 115b ($R_{LBM}$), and the resistance of the ITO ($R_{ITO}$) are connected in parallel. Therefore, the total resistance of the common electrode 107 ($R_C$) is lower than that of the ITO for reducing crosstalks, as can be seen in above equation (4).

The present invention relates to an LCD structure and a method of forming the same for reducing the crosstalk problem of the conventional LCD devices by decreasing the resistance of the common electrode formed in a color filter panel of a high aperture ratio LCD device. In the conventional LCD devices, the black matrix strips are covered by the color filters, so that the common electrode is not connected with the black matrix strips. Since the common electrode is made of ITO, the resistance of the common electrode is higher than that of the metals, so that crosstalk problems exist and the quality of the picture is deteriorated.

In the present invention, the black matrix strips include an opaque metal and the common electrode is connected with the black matrix strips, so that the resistance of the common electrode is lower than that of the opaque metal or the ITO of the common electrode. To realize this, the horizontal and/or the vertical black matrixes are selectively etched and exposed to be electrically connected with the common electrode. Thus, the resistance of time common electrode is decreased, by using an opaque metal having a lower resistance than that of the ITO as the black matrix strips, and by connecting the common electrode with the black matrixes. Furthermore, additional black matrix strips having a lower resistance than the first black matrix strips and/or the ITO are formed at the corresponding portions of the first black matrix strips. As a result, a high aperture ratio LCD panel having a good picture quality without crosstalk problem is formed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a color filter panel of a liquid crystal display device, comprising the steps of:

forming a first black matrix (BM) array on a substrate, the first BM array including a plurality of first horizontal BM strips and a plurality of first vertical BM strips having a narrower width than a data bus line of the liquid crystal display device;

forming a plurality of color filters on the substrate;

forming a second BM array on the first BM array; and forming a common electrode on the substrate and on the first BM array.

2. The method according to claim 1, wherein the step of forming the plurality of color filters includes the steps of:

depositing a first color resin on the substrate and the first vertical and horizonal BM strips, depositing a second color resin adjacent the first color resin, and depositing a third color resin between the first and second color resins.

3. The method according to claim 2, wherein the step of forming the plurality of color filters includes step of:

removing portions of the first, second and third color resins above the first vertical BM strips, so as expose portions of the first vertical BM strips.

4. The method according to claim 3, wherein the step of forming the second BM array includes the steps of:

forming a plurality of second vertical BM strips on the first vertical BM strips, and forming a plurality of second horizontal BM strips on the color filters.

5. The method according to claim 4, wherein in the step of forming the plurality of second horizontal BM strips, the second horizontal BM strips do not contact the first horizontal BM strips.

6. The method according to claim 4, wherein the first vertical BM strips contact the second vertical BM strips, and the first horizontal BM strips contact the second horizontal BM strips.

7. The method according to claim 2, wherein the first, second and third color resins are deposited such that portions of the first horizontal BM strips are exposed.

8. The method according to claim 7, wherein the step of forming the plurality of color filters includes the step of:

removing portions of the first, second and third color resins above the first vertical BM strips, so that portions of the first vertical and horizontal BM strips are exposed.

9. The method according to claim 8, wherein the step of forming the second BM array includes the steps of:

forming a plurality of second vertical BM strips on the exposed portions of the first vertical BM strips, and forming a plurality of second horizontal BM strips on the exposed portions of the first horizontal BM strips.

10. The method according to claim 2, wherein the step of forming the plurality of color filters includes step of:

removing portions of the first, second and third color resins above the first vertical and horizontal BM strips, so as expose portions of the first vertical and horizontal BM strips.

11. The method according to claim 10, wherein the step of forming the second BM array includes the steps of:

forming a plurality of second vertical BM strips on the exposed portions of the first vertical BM strips, and forming a plurality of second horizontal BM strips on the exposed portions of the first horizontal BM strips.

12. The method according to claim 2, wherein the first, second and third color resins are red, green and blue, respectively.

13. The method according to claim 1, wherein in the step of forming the common electrode, the common electrode is formed prior to the step of forming the second BM array.

14. The method according to claim 1, wherein the first BM array substantially corresponds to the second BM array in at least one of shape and size.

15. The method according to claim 1, wherein the second BM array has a lower resistance than the first BM array.

16. The method according to claim 1, wherein in the step of forming the common electrode, the common electrode does not make contact with the plurality of first horizontal BM strips.

17. The method according to claim 1, wherein in the step of forming the common electrode, the common electrode does make contact with the plurality of first horizontal BM strips.

18. A color filter panel of a liquid crystal display device, comprising:

a substrate;

a first black matrix (BM) array formed on a substrate, the first BM array including a plurality of first horizontal BM strips and a plurality of first vertical BM strips having a narrower width than a data bus line of the liquid crystal display device;

a plurality of color filters formed on the substrate;

a second BM array formed on the first BM array; and a common electrode formed on the substrate and on the first BM array.

19. The panel according to claim 18, wherein the plurality of color filters include:

a first color resin formed on the substrate and the first BM array;

a second color resin formed adjacent the first color resin; and a third color resin formed between the first and second color resins.

20. The panel according to claim 19, wherein the first, second and third color resins are red, green and blue resins, respectively.

21. The panel according to claim 18, wherein the color filters are formed so as to expose portions of the first vertical BM strips, and the common electrode is formed on the exposed portions of the first vertical BM strips and the color filters.

22. The panel according to claim 18, wherein the second BM array is formed directly on the common electrode.

23. The panel according to claim 16, wherein the color filters are formed so as to expose portions of the first vertical and horizontal BM strips, and the common electrode is formed on the exposed portions of the first vertical and horizontal BM strips and the color filters.

24. The panel according to claim 18, wherein the second BM array includes a plurality of second vertical BM strips corresponding to the first vertical BM strips, and a plurality of second horizontal BM strips corresponding to the first horizontal BM strips.

25. The panel according to claim 24, wherein the second horizontal BM strips do not contact the first horizontal BM strips.

26. The panel according to claim 24, wherein the common electrode is electrically connected to the first vertical and horizontal BM strips, and to the second vertical and horizontal BM strips.

27. The panel according to claim 18, wherein the first BM array substantially corresponds to the second BM array in at least one of shape and size.

28. The panel according to claim 18, wherein the second BM array has a lower resistance than the first BM array.

* * * * *